United States Patent [19]

Zeuner et al.

[11] Patent Number: 4,822,222
[45] Date of Patent: Apr. 18, 1989

[54] ELECTROHYDRAULIC SYSTEM FOR AN ENCLOSED AUTOMOBILE CARRIER

[75] Inventors: Kenneth W. Zeuner, New Hope; Thomas A. Zeuner, Holland; Donald C. Broschard, Langhorne; William A. Babacz, Newtown, all of Pa.

[73] Assignee: Integrated Technologies and Systems, Inc., Newtown, Pa.

[21] Appl. No.: 18,376

[22] Filed: Feb. 24, 1987

[51] Int. Cl.$^4$ .............................................. B60P 3/08
[52] U.S. Cl. ................................................... 410/29.1
[58] Field of Search ...................... 410/29.1, 24, 26, 2; 296/1 A

[56] References Cited

U.S. PATENT DOCUMENTS

| | | | |
|---|---|---|---|
| 2,892,656 | 6/1959 | Stuart | 296/1.1 |
| 4,046,399 | 9/1977 | Zeuner | 296/1.1 |
| 4,050,596 | 9/1977 | Zeuner et al. | 214/131 A |

FOREIGN PATENT DOCUMENTS 810555  4/1969  Canada ................................ 280/420

OTHER PUBLICATIONS

Polaroid, "Ultrasonic Ranging System".
MTS Systems Corporation, "Temposonics".
James W. Bush, "The Logistical Link", Ward's Auto World, Aug. 1985.
Frank Yeaple, "Jackknife Carloader", Design News, Jul. 20, 1987.

Primary Examiner—Henry A. Bennett
Attorney, Agent, or Firm—Ratner & Prestia

[57] ABSTRACT

A car-carrying trailer having hydraulic cylinders for moving ramps has a single movable manually activated control unit and a single transmission link coupled to the control for controlling substantially all of the cylinders within the trailer. Data is received from the control unit and processed to determine the position of the ramps within the trailer and to produce control signals. Hydraulic cylinders move the ramps in accordance with the control signals. Position sensors transmit feedback to the processor and permit automatic termination of movement of the ramps to prevent damage to the cars. A vehicle is loaded onto the trailer and ramps within the trailer are adjusted until optimum ramp positions are obtained. Further in accordance with the invention sequence number is associated with the optimum ramp positions and the ramp positions are saved in a memory. At a later time, when the vehicle is to be loaded again, a sequence of ramp positions may be accessed. The single transmission link may be a cable or a radio frequency.

22 Claims, 8 Drawing Sheets

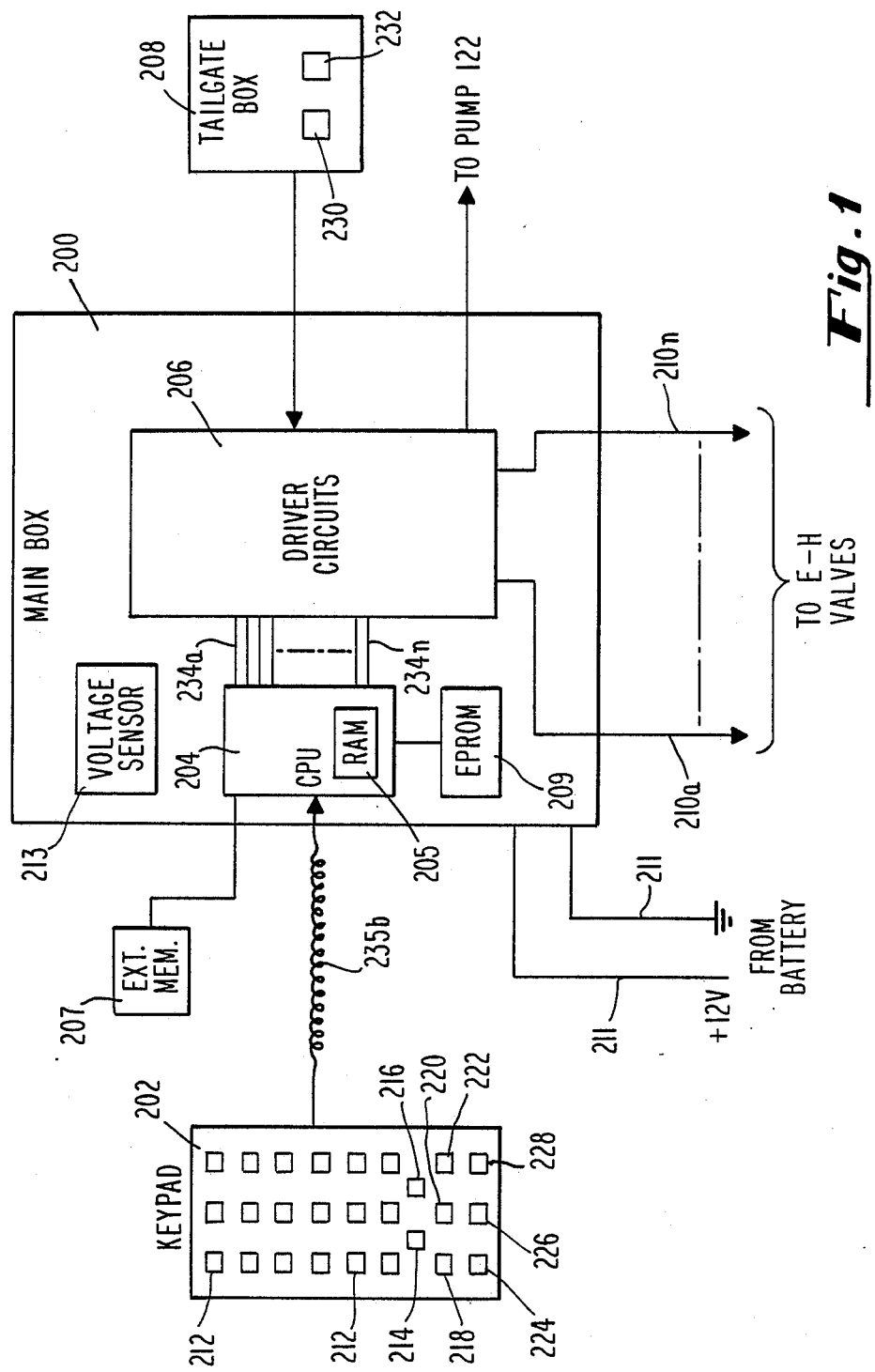

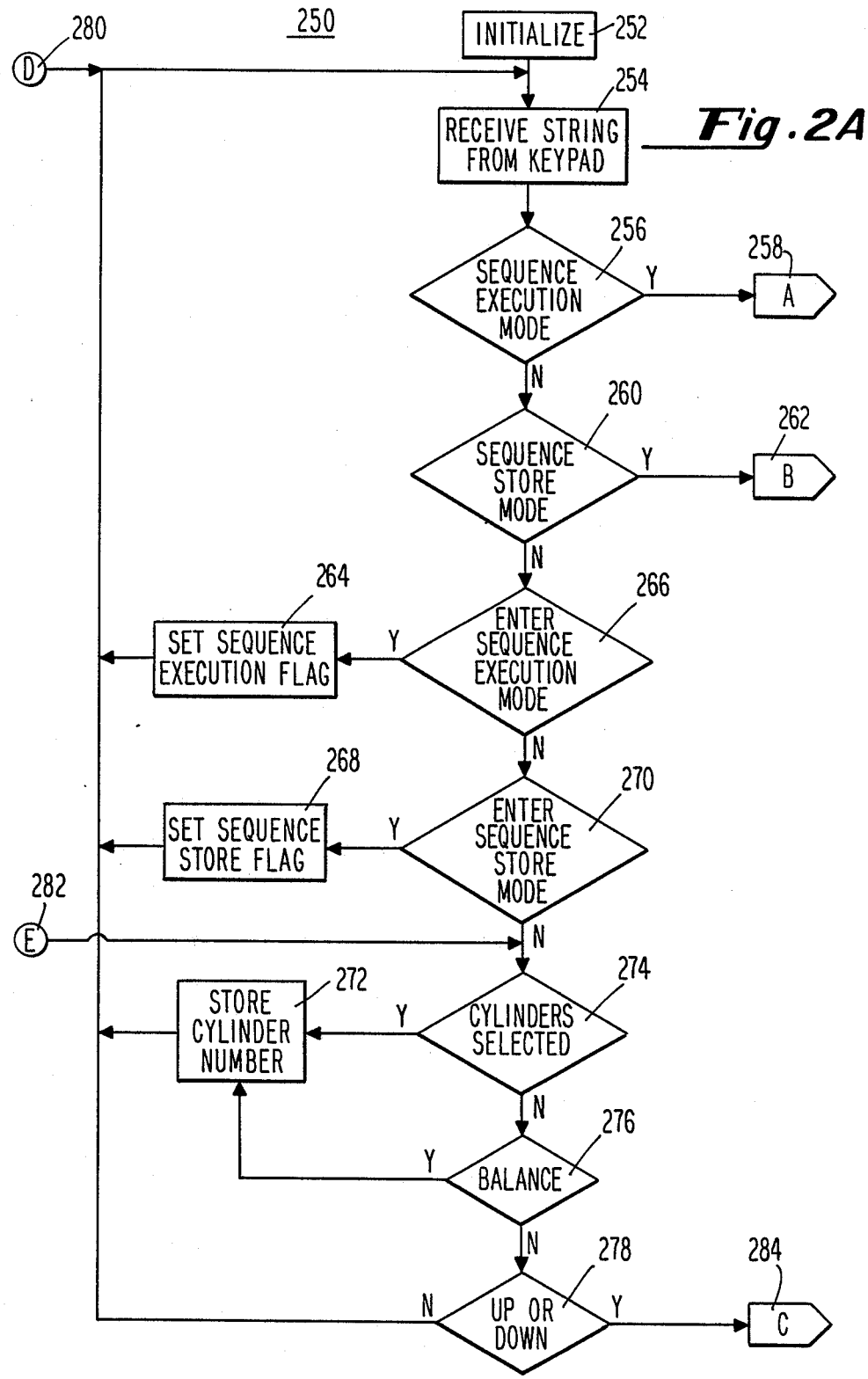

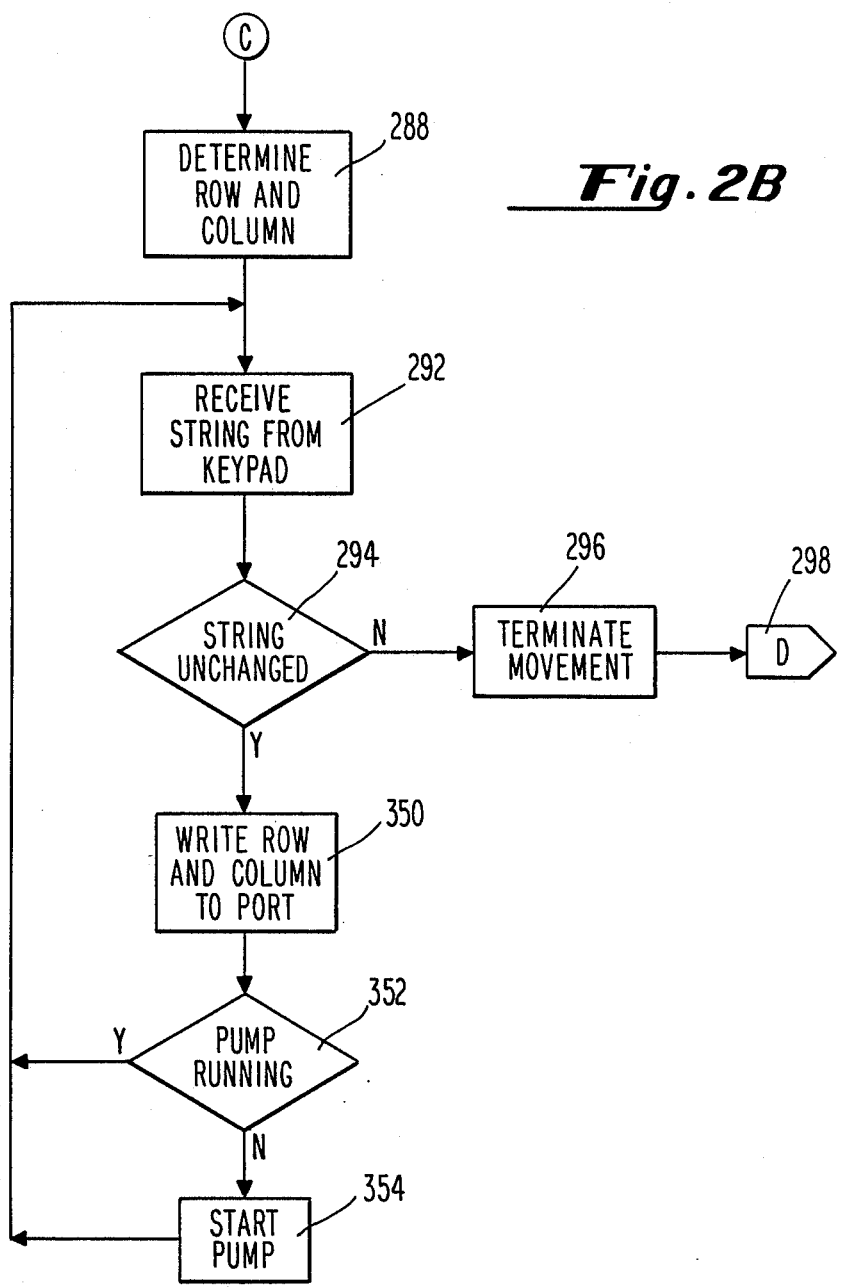

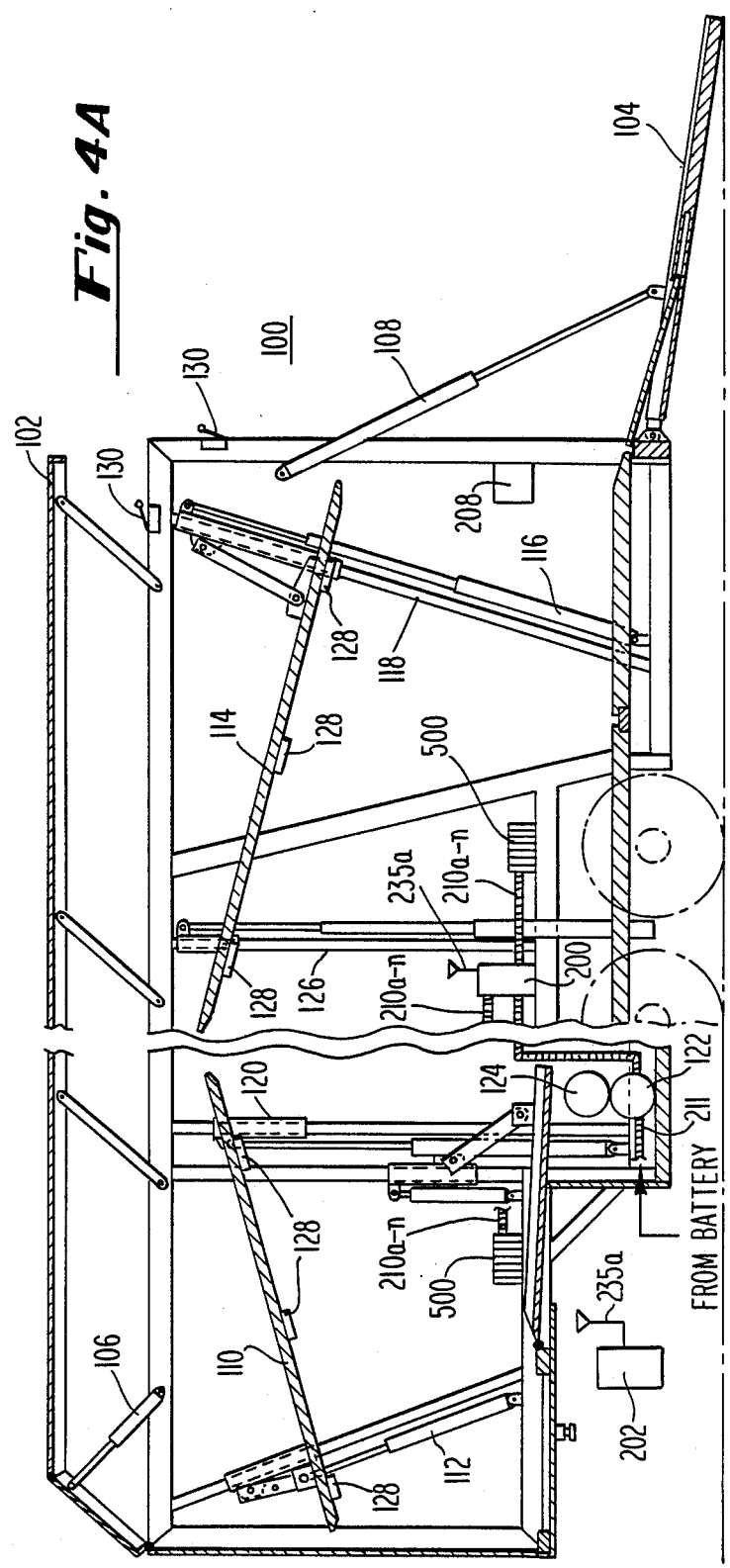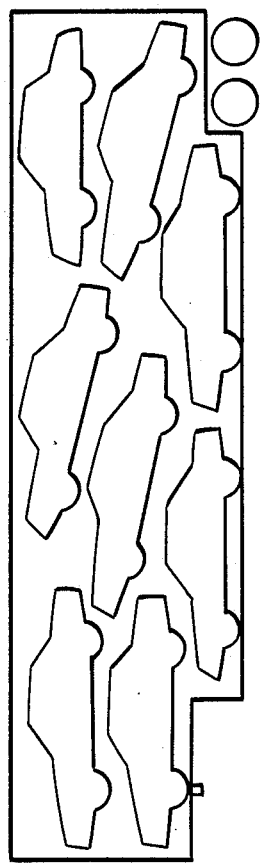

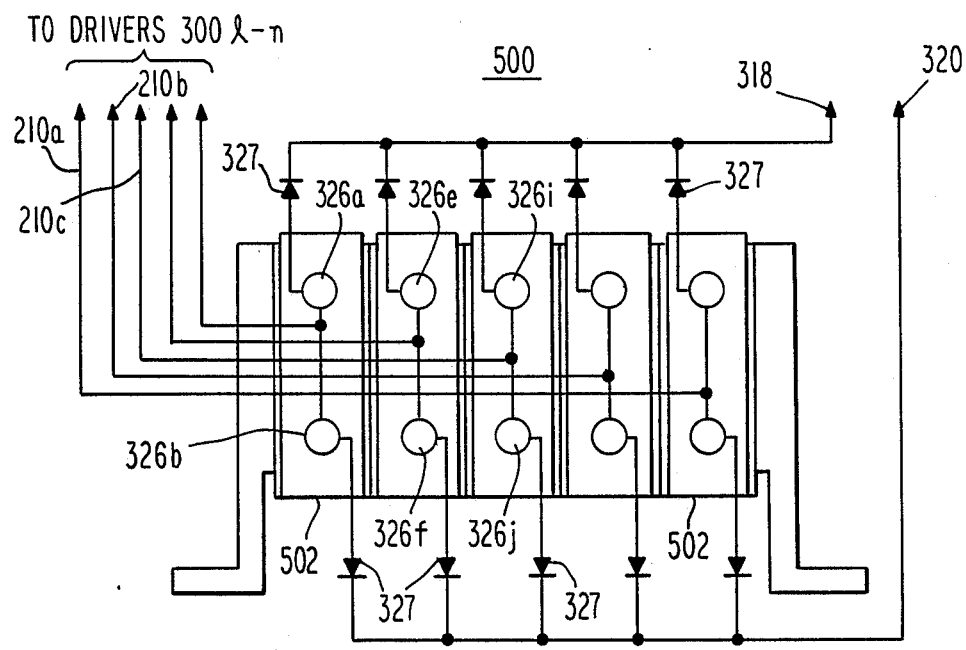
_Fig. 5_
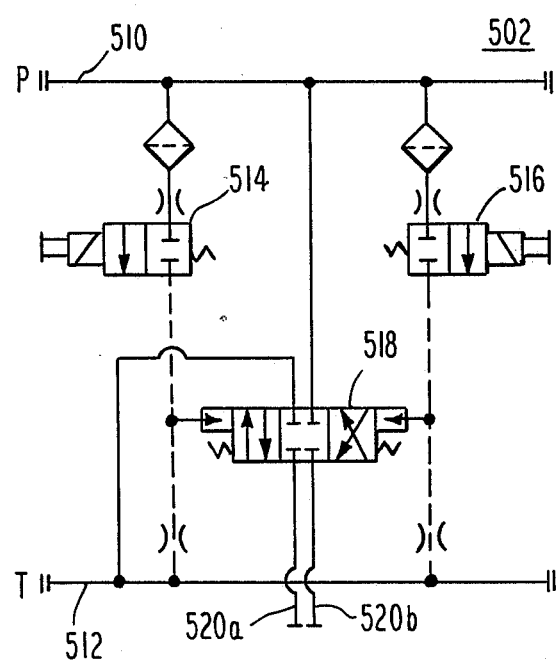
_Fig. 6_

ELECTROHYDRAULIC SYSTEM FOR AN ENCLOSED AUTOMOBILE CARRIER

BACKGROUND OF THE INVENTION

A. Field of the Invention

This invention relates to a automobile-carrying trailer for transporting vehicles and particularly to control of loading of the trailer.

B. Background Art

It is conventional to transport motor vehicles upon open trailers. Usually several vehicles are positioned upon one trailer, several vehicles on a lower deck and several vehicles upon an upper deck. The decks are formed of ramps which may be controlled by hydraulic cylinders. The hydraulic cylinders have been controlled by hydraulic valves which were mechanically actuated by the operator manually, as well as by electrohydraulic valves which were actuated by an operator by means of electrical switches In the prior art, as each vehicle was loaded upon the trailer, the operator adjusted the positions of the ramps to obtain an optimum position for receiving additional cars. In this manner, the most efficient positions for the ramps were obtained thereby maximizing the number of cars that could be loaded into the trailer and minimizing the likelihood of damage from vehicles being hit by a ramp or another vehicle.

This loading was extremely time consuming and was sometimes the occasion for accidental damage to the car.

The mechanical valves were operated by levers which manually shifted hydraulic valve spools. However, because hydraulic lines had to be coupled to the levers, the levers could not be moved while loading cars onto the trailer to permit optimum viewing of the ramps and cars while the ramps were being moved. Thus, the cylinders and, as a result, the ramps were difficult to control with precision making the job of loading vehicles on the trailer more difficult and accident prone.

After loading of an open trailer, during transporting of vehicles, the vehicles were subject to damage because they were exposed to the elements, flying objects and vandalism. Therefore, enclosed trailers were developed to protect the cars.

Since the vehicles on an enclosed trailer and the ramps had to be viewed from many directions and many angles in order to pack the vehicles as closely together as possible while not damaging them, a plurality of control units were located at different locations around the trailer. For example, an enclosed trailer had three different units located at the front, the middle, and the rear of the trailer. This resulted in extra requirements for cables and still required that the operator sometimes leave the controls, view the vehicles and the ramps, and return to the controls and operate them without actually being in the best position for viewing the result of the operation.

SUMMARY OF THE INVENTION

A car-carrying trailer having hydraulic cylinders for moving ramps has a single movable manually activated control unit and a single transmission link coupled to the control unit for controlling substantially all of the cylinders within the trailer. Data is received from the control unit and processed to determine the position of the ramps within the trailer to and produce control signals. Hydraulic cylinders move the ramps in accordance with the control signals. Position sensors transmit feedback to the processor and permit automatic termination of movement of the ramps to prevent damage to the cars. Further in accordance with the invention a sequence number is associated with the optimum ramp positions and the ramp positions are saved in a memory. At a later time, when the vehicle is to be loaded again, a sequence of ramp positions may be accessed.

BRIEF DESCRIPTION OF THE DRAWINGS

FIG. 1 is a block diagram of the electronics of the system of the present invention;

FIGS. 2A-E are flowchart representations of a method for adjusting ramp positions and storing and accessing sequences of ramp positions;

FIG. 4A is a cross-sectional view of an enclosed trailer in which the system of the present invention may operate;

FIG. 4B is a representation of how cars may be packed into a car-carrying trailer;

FIG. 5 is a representation of a stack of valves of the trailer of FIG. 4A; and

FIG. 6 is a hydraulic circuit diagram of one of the valves of FIG. 5.

DETAILED DESCRIPTION OF THE INVENTION

Figure 2C:
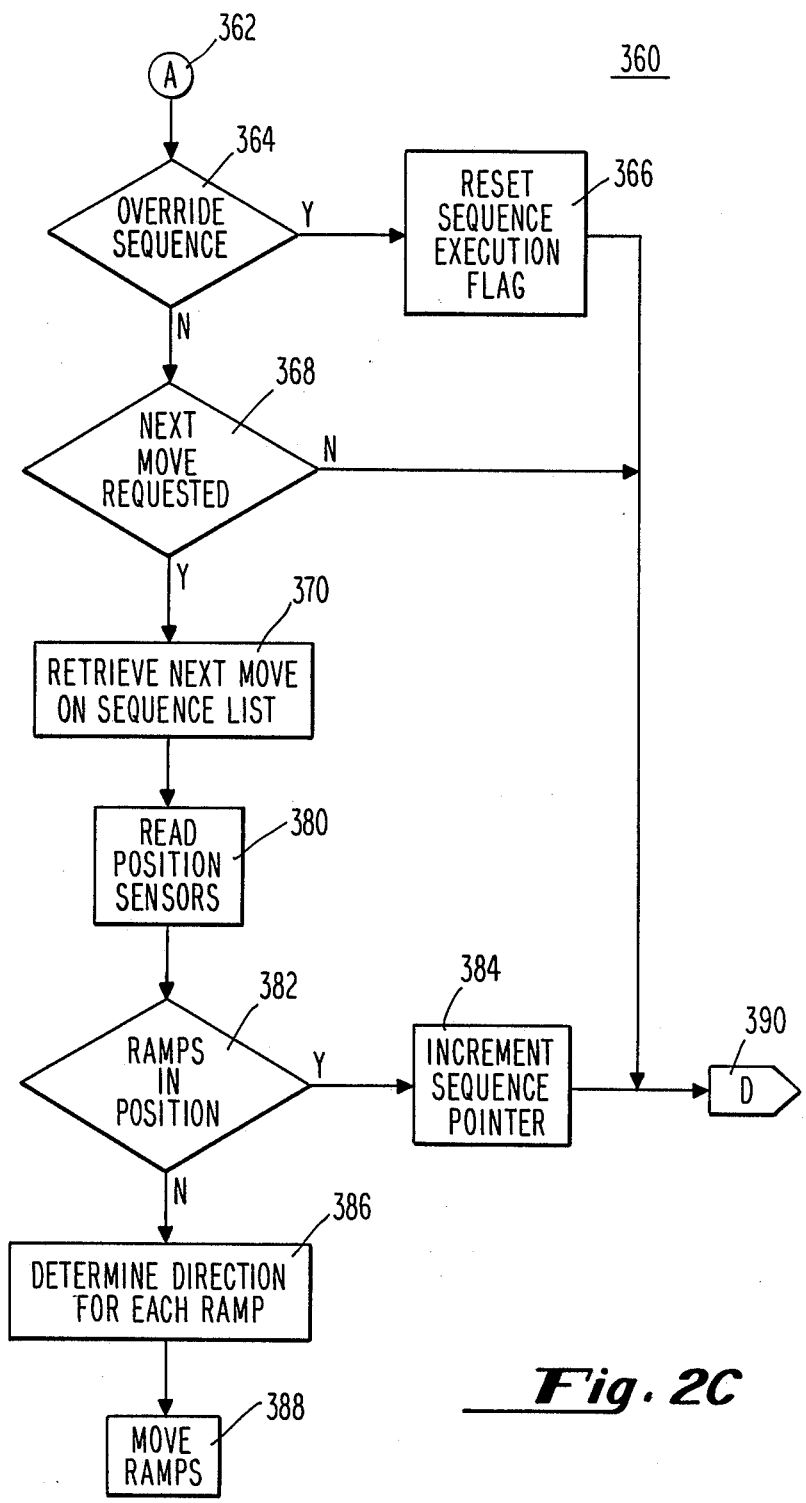

Referring now to FIG. 1, there is shown a block diagram of the electronics of the system of the present invention. Main box 200 is fixed on a car-carrying tailer and includes CPU 204 and driver circuits 206. Keypad 202 which is coupled by a single channel 233 to CPU 204 is a moveable unit which may be used to control substantially all of the electro-hydraulic cylinders of the automobile carrying trailer. Switches 212 of keypad 202 may select valves and thereby hydraulic cylinders of the trailer of the automobile carrier of the present invention as will be described in detail below. These hydraulic cylinders control the position of ramps within the trailer of the automobile carrier. Switches 214, 216 are used to select a direction, up or down respectively, of the hydraulic cylinder or cylinders selected by switches 212.

Single moveable keypad unit 202 permits an operator to view ramps and vehicles being loaded onto the ramps from whatever position and angle are best for loading vehicles into the trailer while causing the ramps to move. Moveable unit 202 may be moved to any location in or around the trailer while the operator optimizes the loading of vehicles onto the trailer and avoids damage to the vehicles caused by contact between vehicles or between the vehicle and a ramp. Thus the operator may observe critical clearances while actually moving the ramps rather than returning to a fixed control unit, which may not be in the optimum position for observing, while the ramps are in motion.

Keypad 202 provides data representative of the switches pressed by the operator. Channel 435b, which links keypad 202 to CPU 204, transmits the data from keypad 202 to CPU 204.

The data received by CPU 204 by way of single channel 233 is processed by CPU 204. CPU 204 determines ramp position control signals for controlling the position of the ramps according to the data received. Hydraulic cylinders then move the ramps according to the control signals from CPU 204 while the operator observes the movements.

In addition to controlling the cylinder movements and ramp positions, the system of the present invention provides position feedback to help prevent damage to the vehicles. The ramps of the trailer are provided with proximity sensors, such as sonar sensors, which provide a signal to CPU 204 when a ramp is within a predetermined distance of a surface, for example the surface of a vehicle. In response to a proximity sensor signal CPU 204 terminates all movement of all ramps to prevent contact between a ramp and a vehicle and prevent damage to the vehicle.

Switches 218, 220 select the mode of the present invention. Switch 218 selects the sequence execution mode in which a stored sequence of optimum ramp positions, as measured by the proximity sensors previously described or by position sensors within the cylinders, is accessed and implemented by the present invention In the sequence execution mode a car may be loaded onto the trailer and the ramps of the trailer rearranged by CPU 204 into an optimum position to prepare the trailer to receive the next car to be loaded. The sequence of optimum ramp positions being executed is stored in memory 205.

After the next car is loaded, the next set of ramp positions in the sequence of optimum ramp positions is accessed from memory 205 and implemented by CPU 204 causing the ramps to be positioned in the optimum position for receiving the next car. Thus an optimum sequence of ramp positions for a group of cars to be loaded onto the trailer may be stored and accessed to facilitate loading of cars. Sets of sequences, each set corresponding to cars of particular dimensions, may be stored in external memory 207 and loaded into memory 205 when required.

Switch 220 of keypad 202 causes the system of the present invention to enter the sequence store mode. In the sequence store mode an optimum sequence of ramp positions is determined and stored for accessing at a later time during the sequence execution mode. Thus a car may be loaded onto the trailer and the positions of the ramps adjusted using switches 212, 214, 216 of keypad 202 to receive the next car, in a manner which will be discussed in detail below. When the optimum positions of the ramps for receiving the next car are achieved, save button 222 is pressed causing the positions of the ramps to be stored into a sequence in memory 205. A sequence of positions thus developed may be stored in external memory 207 and accessed and downloaded into memory 205 at a later time. The accessed sequence may then be executed by the sequence execution mode of the present invention as previously described.

CPU 204 controls cylinders for moving ramps within the trailer by way of lines 234a-n which apply signals from CPU 204 to driver circuits 206. By way of lines 210a-n driver circuits 206 control electrohydraulic valves which actuate cylinders to move the ramps of the trailer.

Tailgate box 208 permits an operator to raise the top of the trailer by pushing switch 230 and to lower the rear ramp of the trailer by pushing switch 232. Tailgate box 208 is mounted in the trailer near a sliding door to permit access when the trailer is locked up.

The electronics of the system of the present invention may be energized from the truck electrical system (not shown) of the automobile carrier by way of lines 211.

Lines 211 may be provided with a bridge rectifier (not shown) to protect the electronics from polarity reversal.

Referring now FIG. 4A there is shown a cross-sectional view of portions of trailer 100. Ramps, such as ramp 110 and ramp 114, are used for loading cars. An operator may use movable keypad 202 while watching cars being loaded onto ramps 110,114 from any angle desired. The operator may move ramps 110,114 while looking at them from the optimum angle to avoid damage to cars while loading cars into trailer 100 to load the cars as shown, for example, in FIG. 4B. Thus, keypad 202 serves as a single movable manually-activated unit for controlling substantially all of the cylinders within trailer 100.

When a switch on keypad 202 is pressed data from keypad 202 is transmitted to CPU 204 within main box 200 by way of wireless channel 235a. Channel 235a is a single transmission link coupled to keypad 202 for receiving data from keypad 202 and transmitting the data to CPU 204. The data from keypad 202 indicates which key is pressed. The communication channel between keypad 202 and box 200 may be cable 235b or a radio channel 235a or infrared or any other type of communication link.

CPU 204 receives the data from keypad 202 and determines the position of ramps such as ramps 110,114 in accordance with the data transmitted from keypad 202. Ramps 110,114, and all the other ramps within trailer 100 are moved by hydraulic cylinders, such as cylinders 112, 116, 118, 120 for moving the ramps in accordance with ramp position control signals which are provided by CPU 204 in accordance with the data transmitted from keypad 202. Cylinders 112, 116, 118, 120 are coupled to pump 122 by way of valve stacks 500 for providing fluid pressure to hydraulically move the cylinders and thereby move the ramps. Trailer 100 is provided with a back-up pump 124.

Ramps 110, 114, and as many other ramps as desired within trailer 100, are provided with proximity sensors 128. Proximity sensors 128, which may be ultrasonic or light beam or any other type of proximity sensors, provide an interrupt signal to CPU 204 when an object, such as a car, is within a predetermined distance of sensors 128. CPU 204, upon receiving an interrupt signal from sensors 128 stops all motion of all ramps and thereby prevents the ramps from coming into contact with the surface of a car and damaging the car.

Main box 200 is fixed to trailer 100 as close to the middle of trailer 100, from front to back, as possible in order to minimize the length of cables from box 200 to valves 500 and thereby to minimize voltage drops along the cable.

Auxiliary pump 124 may be activated by an auxiliary pump power switch (not shown) to allow auxiliary pump 124 to be operated when pump 122 is not working. A manual switch (not shown) is provided to operate pump 122 when the system electronics are not working. Thus if the electronics of the system of the present invention are, for any reason, not operating, the ramps of the trailer may still be moved. Individual cylinders on trailer 100 may be moved up or down by means of manual knobs (not shown) provided on each valve section 502 One knob is provided for moving the corresponding cylinder up and one knob is provided for moving the corresponding cylinder down in a known manner. These and other conventional features of valves and cylinders are taught in U.S. Pat. Nos.

4,046,399 and 4,050,596 which are herein incorporated by reference.

Cable 211, from the truck battery (not shown) is first connected to pump 122. From pump 122 the cable is next connected to main box 200. Due to voltage drops along the cable the voltage applied to main box 200 is approximately 11.2 to 11.3 volts. Line 210 then couples voltage from box 200 to valve stacks 500. Due to voltage drops along line 210 the voltage applied to valve stacks 500 is approximately 9.5-10 volts. Limit switches 130 indicate to main box 200 when roof 102 is completely lowered and when gate 104 is completely closed.

Voltage sensor 213 of main box 200 monitors the voltage applied by lines 211 to main box 200. If this voltage falls below approximately 8.5 to 9 volts for more than approximately one second, voltage sensor 205 decouples main box 200 from line 211 by deactivating a relay (not shown) within main box 200 which holds main box 200 in electrical contact with the battery. Thus the system is protected against a low voltage level which may cause CPU 204 to become unreliable. A conventional voltage comparator (not shown) within voltage sensor 213 determines when the voltage has fallen below the predetermined range of approximately 8.5 to 9 volts.

Referring now to FIG. 2A, there is shown a flowchart 250. Flowchart 250 is a high level flowchart describing the operations executed by CPU 204 to perform the functions previously described.

Execution of chart 250 begins at initialize block 252 and proceeds to block 254 in which CPU 204 receives a string from keypad 202 by way of channel 233. It will be understood by those skilled in the art that channel 233 may be cable 235b, radio transmission channel 235a or any type of communication link by which keypad 202 may communicate to CPU 204 which switch on keypad 202 has been pressed.

At decision 256, a determination is made whether the system of the present invention is currently in the sequence execution mode. Sequence execution mode is determined by looking at the sequence flag which is set when sequence execution switch 218 of keypad 202 is pressed. It is in the sequence execution mode that a stored sequence of optimum ramp positions may be accessed from external memory 207 downloaded to memory 205 within CPU 204 and executed by CPU 204. If the system is in the sequence execution mode, as determined at decision 256, execution leaves flowchart 250 by way of offpage connecter 258.

If a determination is made at decision 256 that the system is not in the sequence execution mode a determination is made at decision 260 whether the system is currently in the sequence store mode. If the system is in the sequence store mode execution proceeds to offpage connector 262.

If the system is currently in neither the sequence execution mode nor the sequence store mode, a determination is made at decision 266 whether the operator has pressed switch 218 of keypad 202 signalling that the system should enter the sequence execution mode. If switch 218 has been depressed, execution proceeds to block 264 where the sequence execution flag is set. Execution then proceeds to block 254 where another string may be received from keypad 202.

If switch 218 has not been pressed, a determination is made at decision 270 whether the operator has pressed switch 220 signalling that the system should enter the sequence store mode. If switch 220 has been depressed, execution proceeds to block 268 where the sequence store flag is set. Execution then proceeds to block 254 where another string may be received from keypad 202.

At decision 274 a determination is made whether any cylinders have been selected. Although automobile carrying trailers may have different numbers of cylinders, the system of the present invention includes seventeen pairs of cylinders in which one cylinder of the pair of cylinders is on the left side of a ramp and the other cylinder of the pair is on the corresponding right side. Each pair of cylinders has an associated switch 212. Keypad 202 also includes an eighteenth switch 212. The eighteenth switch 212 may be used to clear previously entered instructions. If a pair of cylinders is selected by a switch 212, an identification of the pair of cylinders is stored in block 276.

If a ramp is not level, the operator may select one cylinder of a pair of cylinders for movement in order to make the ramp level using balance switches 224, 228. The left cylinder is selected by switch 224, the right cylinder is selected by switch 228, and both ramps of the pair are selected by button 226. If switches 224, 226, 228 are not pressed after a selection by switches 212, both cylinders of the pair are selected. All movements up or down default to the last balance selection.

If a balance is selected, as determined in decision 276, by pressing a switch 224, 228, the single cylinder of the pair of cylinders selected is stored in block 272.

Table 1 sets forth a truth table showing which cylinder pairs and relays 310, 312, 314 and 316 are selected for each switch 212, balance switch 224, 226, 228 and direction switch 214, 216. Switches 212 are numbered sequentially from left to right and from top to bottom on keypad 202. The cylinders are arranged on the trailer as required to move the ramps. The pump is activated for each line of Table 1.

TABLE 1

| 212 | 224 226 228 | 214 216 | \multicolumn{17}{c}{Cylinders} | \multicolumn{4}{c}{Relays} |
|---|---|---|---|---|---|---|---|---|---|---|---|---|---|---|---|---|---|---|---|---|---|---|
| | | | 1 | 2 | 3 | 4 | 5 | 6 | 7 | 8 | 9 | 10 | 11 | 12 | 13 | 14 | 15 | 16 | 17 | 310 | 312 | 314 | 316 |
| 1 | 224 | 214 | X | | | | | | | | | | | | | | | | | X | | | |
| | 228 | | X | | | | | | | | | | | | | | | | | | | X | |
| | 226 | | X | | | | | | | | | | | | | | | | | X | | X | |
| | 224 | 216 | X | | | | | | | | | | | | | | | | | | X | | |
| | 228 | | X | | | | | | | | | | | | | | | | | | | | X |
| | 226 | | X | | | | | | | | | | | | | | | | | | X | | X |
| 2 | 224 | 214 | | X | | | | | | | | | | | | | | | | X | | | |
| | 228 | | | X | | | | | | | | | | | | | | | | | | X | |
| | 226 | | | X | | | | | | | | | | | | | | | X | | X | |
| | 224 | 216 | | X | | | | | | | | | | | | | | | | | X | | |
| | 228 | | | X | | | | | | | | | | | | | | | | | | X | |
| | 226 | | | X | | | | | | | | | | | | | | | | | X | | X |
| 3 | 224 | 214 | | | X | | | | | | | | | | | | | | | X | | | |

TABLE 1-continued

| 212 | 224 / 226 / 228 | 214 / 216 | \multicolumn{17}{c}{Cylinders} | \multicolumn{4}{c}{Relays} |
|---|---|---|---|---|---|---|---|---|---|---|---|---|---|---|---|---|---|---|---|---|---|---|---|
|     |     |     | 1 | 2 | 3 | 4 | 5 | 6 | 7 | 8 | 9 | 10 | 11 | 12 | 13 | 14 | 15 | 16 | 17 | 310 | 312 | 314 | 316 |
|     | 228 |     |   |   | X |   |   |   |   |   |   |   |   |   |   |   |   |   |   |   |   | X |   |
|     | 226 |     |   |   | X |   |   |   |   |   |   |   |   |   |   |   |   |   |   | X |   | X |   |
|     | 224 | 216 |   |   | X |   |   |   |   |   |   |   |   |   |   |   |   |   |   |   | X |   |   |
|     | 228 |     |   |   | X |   |   |   |   |   |   |   |   |   |   |   |   |   |   |   |   |   | X |
|     | 226 |     |   |   | X |   |   |   |   |   |   |   |   |   |   |   |   |   |   |   | X |   | X |
| 4   | 224 | 214 |   |   |   | X |   |   |   |   |   |   |   |   |   |   |   |   |   | X |   |   |   |
|     | 228 |     |   |   |   | X |   |   |   |   |   |   |   |   |   |   |   |   |   |   |   | X |   |
|     | 226 |     |   |   |   | X |   |   |   |   |   |   |   |   |   |   |   |   |   | X |   | X |   |
|     | 224 | 216 |   |   |   | X |   |   |   |   |   |   |   |   |   |   |   |   |   |   | X |   |   |
|     | 228 |     |   |   |   | X |   |   |   |   |   |   |   |   |   |   |   |   |   |   |   |   | X |
|     | 226 |     |   |   |   | X |   |   |   |   |   |   |   |   |   |   |   |   |   |   | X |   | X |
| 5   | 224 | 214 |   |   |   |   | X |   |   |   |   |   |   |   |   |   |   |   |   | X |   |   |   |
|     | 228 |     |   |   |   |   | X |   |   |   |   |   |   |   |   |   |   |   |   |   |   | X |   |
|     | 226 |     |   |   |   |   | X |   |   |   |   |   |   |   |   |   |   |   |   | X |   | X |   |
|     | 224 | 216 |   |   |   |   | X |   |   |   |   |   |   |   |   |   |   |   |   |   | X |   |   |
|     | 228 |     |   |   |   |   | X |   |   |   |   |   |   |   |   |   |   |   |   |   |   |   | X |
|     | 226 |     |   |   |   |   | X |   |   |   |   |   |   |   |   |   |   |   |   |   | X |   | X |
| 6   | 224 | 214 |   |   |   |   |   | X |   |   |   |   |   |   |   |   |   |   |   | X |   |   |   |
|     | 228 |     |   |   |   |   |   | X |   |   |   |   |   |   |   |   |   |   |   |   |   | X |   |
|     | 226 |     |   |   |   |   |   | X |   |   |   |   |   |   |   |   |   |   |   | X |   | X |   |
|     | 224 | 216 |   |   |   |   |   | X |   |   |   |   |   |   |   |   |   |   |   |   | X |   |   |
|     | 228 |     |   |   |   |   |   | X |   |   |   |   |   |   |   |   |   |   |   |   |   |   | X |
|     | 226 |     |   |   |   |   |   | X |   |   |   |   |   |   |   |   |   |   |   |   | X |   | X |
| 7   | 224 | 214 |   |   |   |   |   |   | X |   |   |   |   |   |   |   |   |   |   | X |   |   |   |
|     | 228 |     |   |   |   |   |   |   | X |   |   |   |   |   |   |   |   |   |   |   |   | X |   |
|     | 226 |     |   |   |   |   |   |   | X |   |   |   |   |   |   |   |   |   |   | X |   | X |   |
|     | 224 | 216 |   |   |   |   |   |   | X |   |   |   |   |   |   |   |   |   |   |   | X |   |   |
|     | 228 |     |   |   |   |   |   |   | X |   |   |   |   |   |   |   |   |   |   |   |   |   | X |
|     | 226 |     |   |   |   |   |   |   | X |   |   |   |   |   |   |   |   |   |   |   | X |   | X |
| 8   | 224 | 214 |   |   |   |   |   |   |   | X |   |   |   |   |   |   |   |   |   | X |   |   |   |
|     | 228 |     |   |   |   |   |   |   |   | X |   |   |   |   |   |   |   |   |   |   |   | X |   |
|     | 226 |     |   |   |   |   |   |   |   | X |   |   |   |   |   |   |   |   |   | X |   | X |   |
|     | 224 | 216 |   |   |   |   |   |   |   | X |   |   |   |   |   |   |   |   |   |   | X |   |   |
|     | 228 |     |   |   |   |   |   |   |   | X |   |   |   |   |   |   |   |   |   |   |   |   | X |
|     | 226 |     |   |   |   |   |   |   |   | X |   |   |   |   |   |   |   |   |   |   | X |   | X |
| 9   | 224 | 214 |   |   |   |   |   |   |   |   | X |   |   |   |   |   |   |   |   | X |   |   |   |
|     | 228 |     |   |   |   |   |   |   |   |   | X |   |   |   |   |   |   |   |   |   |   | X |   |
|     | 226 |     |   |   |   |   |   |   |   |   | X |   |   |   |   |   |   |   |   | X |   | X |   |
|     | 224 | 216 |   |   |   |   |   |   |   |   | X |   |   |   |   |   |   |   |   |   | X |   |   |
|     | 228 |     |   |   |   |   |   |   |   |   | X |   |   |   |   |   |   |   |   |   |   |   | X |
|     | 226 |     |   |   |   |   |   |   |   |   | X |   |   |   |   |   |   |   |   |   | X |   | X |
| 10  | 224 | 214 |   |   |   |   |   |   |   |   |   | X |   |   |   |   |   |   |   | X |   |   |   |
|     | 228 |     |   |   |   |   |   |   |   |   |   | X |   |   |   |   |   |   |   |   |   | X |   |
|     | 226 |     |   |   |   |   |   |   |   |   |   | X |   |   |   |   |   |   |   | X |   | X |   |
|     | 224 | 216 |   |   |   |   |   |   |   |   |   | X |   |   |   |   |   |   |   |   | X |   |   |
|     | 228 |     |   |   |   |   |   |   |   |   |   | X |   |   |   |   |   |   |   |   |   |   | X |
|     | 226 |     |   |   |   |   |   |   |   |   |   | X |   |   |   |   |   |   |   |   | X |   | X |
| 11  | 224 | 214 |   |   |   |   |   |   |   |   |   |   | X |   |   |   |   |   |   | X |   |   |   |
|     | 228 |     |   |   |   |   |   |   |   |   |   |   | X |   |   |   |   |   |   |   |   | X |   |
|     | 226 |     |   |   |   |   |   |   |   |   |   |   | X |   |   |   |   |   |   | X |   | X |   |
|     | 224 | 216 |   |   |   |   |   |   |   |   |   |   | X |   |   |   |   |   |   |   | X |   |   |
|     | 228 |     |   |   |   |   |   |   |   |   |   |   | X |   |   |   |   |   |   |   |   |   | X |
|     | 226 |     |   |   |   |   |   |   |   |   |   |   | X |   |   |   |   |   |   |   | X |   | X |
| 12  | 224 | 214 |   |   |   |   |   |   |   |   |   |   |   | X |   |   |   |   |   | X |   |   |   |
|     | 228 |     |   |   |   |   |   |   |   |   |   |   |   | X |   |   |   |   |   |   |   | X |   |
|     | 226 |     |   |   |   |   |   |   |   |   |   |   |   | X |   |   |   |   |   | X |   | X |   |
|     | 224 | 216 |   |   |   |   |   |   |   |   |   |   |   | X |   |   |   |   |   |   | X |   |   |
|     | 228 |     |   |   |   |   |   |   |   |   |   |   |   | X |   |   |   |   |   |   |   |   | X |
|     | 226 |     |   |   |   |   |   |   |   |   |   |   |   | X |   |   |   |   |   |   | X |   | X |
| 13  | 224 | 214 |   |   |   |   |   |   |   |   |   |   |   |   | X |   |   |   |   | X |   |   |   |
|     | 228 |     |   |   |   |   |   |   |   |   |   |   |   |   | X |   |   |   |   |   |   | X |   |
|     | 226 |     |   |   |   |   |   |   |   |   |   |   |   |   | X |   |   |   |   | X |   | X |   |
|     | 224 | 216 |   |   |   |   |   |   |   |   |   |   |   |   | X |   |   |   |   |   | X |   |   |
|     | 228 |     |   |   |   |   |   |   |   |   |   |   |   |   | X |   |   |   |   |   |   |   | X |
|     | 226 |     |   |   |   |   |   |   |   |   |   |   |   |   | X |   |   |   |   |   | X |   | X |
| 14  | 224 | 214 |   |   |   |   |   |   |   |   |   |   |   |   |   | X |   |   |   | X |   |   |   |
|     | 228 |     |   |   |   |   |   |   |   |   |   |   |   |   |   | X |   |   |   |   |   | X |   |
|     | 226 |     |   |   |   |   |   |   |   |   |   |   |   |   |   | X |   |   |   | X |   | X |   |
|     | 224 | 216 |   |   |   |   |   |   |   |   |   |   |   |   |   | X |   |   |   |   | X |   |   |
|     | 228 |     |   |   |   |   |   |   |   |   |   |   |   |   |   | X |   |   |   |   |   |   | X |
|     | 226 |     |   |   |   |   |   |   |   |   |   |   |   |   |   | X |   |   |   |   | X |   | X |
| 15  | 224 | 214 |   |   |   |   |   |   |   |   |   |   |   |   |   |   | X |   |   | X |   |   |   |
|     | 228 |     |   |   |   |   |   |   |   |   |   |   |   |   |   |   | X |   |   |   |   | X |   |
|     | 226 |     |   |   |   |   |   |   |   |   |   |   |   |   |   |   | X |   |   | X |   | X |   |
|     | 224 | 216 |   |   |   |   |   |   |   |   |   |   |   |   |   |   | X |   |   |   | X |   |   |
|     | 228 |     |   |   |   |   |   |   |   |   |   |   |   |   |   |   | X |   |   |   |   |   | X |
|     | 226 |     |   |   |   |   |   |   |   |   |   |   |   |   |   |   | X |   |   |   | X |   | X |
| 16  | 224 | 214 |   |   |   |   |   |   |   |   |   |   |   |   |   |   |   | X |   | X |   |   |   |
|     | 228 |     |   |   |   |   |   |   |   |   |   |   |   |   |   |   |   | X |   |   |   | X |   |

TABLE 1-continued

| 212 | 224 226 228 | 214 216 | 1 | 2 | 3 | 4 | 5 | 6 | 7 | 8 | 9 | 10 | 11 | 12 | 13 | 14 | 15 | 16 | 17 | 310 | 312 | 314 | 316 |
|---|---|---|---|---|---|---|---|---|---|---|---|---|---|---|---|---|---|---|---|---|---|---|---|
| | 226 | 216 | | | | | | | | | | | | | | | | X | | X | | X | |
| | 224 | | | | | | | | | | | | | | | | | X | | | X | | |
| | 228 | | | | | | | | | | | | | | | | | X | | | | | X |
| | 226 | | | | | | | | | | | | | | | | | X | | | X | | X |
| 17 | 224 | 214 | | | | | | | | | | | | | | | | | X | X | | | |
| | 228 | 216 | | | | | | | | | | | | | | | | | X | | X | | |
| | 226 | | | | | | | | | | | | | | | | | | X | X | | X | |
| | 224 | | | | | | | | | | | | | | | | | | X | | X | | |
| | 228 | | | | | | | | | | | | | | | | | | X | | | | X |
| | 226 | | | | | | | | | | | | | | | | | | X | | X | | X |

At decision 278 a determination is made whether an up or a down is received from switches 214, 16 of keypad 202. If switch 214 or switch 216 have not been pressed, execution returns to block 254 to receive another string from keypad 202. If switch 214 or switch 216 has been pressed, execution proceeds to offpage connector 284.

Referring now to FIG. 2B, there is shown flowchart 290 which is a continuation of flowchart 250. Execution enters flowchart 290 by way of on-page connector 286 from offpage connecter 284. At block 288 a determination is made of the row and column of driver circuits 206 to be energized in order to activate the selected cylinder or cylinders as will be discussed in detail below. The selected cylinder or cylinders was previously selected by the operator by pressing switches 212, 224, 226, 228.

At block 292 another string is received from keypad 202. At decision 294 a determination is made whether the string received in block 292 is unchanged from the string received in block 254. If the string received in block 292 is changed, all movement is terminated in block 296 and execution proceeds by way of offpage connector 298 to receive an additional string in block 254. This requirement that the string remain unchanged between box 254 and box 292 helps prevent minor glitches from causing incorrect function of the system.

If the string received in block 292 is unchanged, CPU 204 writes to the selected row and column of driver circuits 206 in order to activate the selected cylinder or cylinders. Thus CPU 204 provides ramp control signals by way of driver circuits 206. At decision 352 a determination is made whether the pump for the cylinders is running. If the pump is not running, as determined at decision 352 the pump is started at block 354. When the pump is running, execution returns to block 292 and another string is received from keypad 202. Thus execution returns to block 292 and decision 294 until the string received from keypad 202 is changed. Thus, as long as the operator keeps an up/down switch 214, 216 depressed the selected cylinders continue to move up or down. When switch 214, 216 is released, execution proceeds by way of decision 294 to block 296 where the movement of the cylinders is terminated.

Referring now to FIG. 2C, there is shown flowchart 360. Flowchart 360 is a high level representation of a routine for performing the sequence execution mode. When the system of the present invention is in the sequence execution mode, as determined in decision 256, execution proceeds, by way of offpage connecter 258, to onpage connector 362.

A determination is then made at decision 364 whether an override of the sequence execution mode has been requested. A sequence execution mode override may be requested, for example, by pressing the eighteenth switch 212. If a system override has been requested, the sequence execution flag is reset in block 366 and execution proceeds from flowchart 360 by way of offpage connector 390 to receive another string from keypad 202. Execution of a sequence may be continued by again pressing switch 218.

At decision 368 a determination is made whether the next set of ramp positions in the sequence of ramp positions has been requested. The next move may be requested, for example, by pressing switch 222 of keypad 202. If the next set of ramp positions has been requested, the next set is retrieved from the sequence list of sets in block 370. In block 380 the position sensors which sense the position of the ramps in the trailer are read. At decision 382 a determination is made whether the ramps are in the position retrieved in block 370. If the ramps are in position the sequence pointer, which points to the next set of positions in the sequence, is incremented in block 384 and execution exits by way of offpage connector 390.

If the ramps are not in position, as determined in decision 382, CPU 204 determines the direction of movement for each ramp in order to bring each ramp in compliance with the positions read at sequence retrieved in block 370. At block 388 each cylinder or pair of cylinders is moved, as previously described in flowchart 290 in the directions determined in block 386. The position sensors are again read in block 380 and determination is again made whether all the ramps are in position in decision 382. Thus, execution loops from block 380 to block 388 until the ramps are in the position retrieved from the sequence list. When the ramps are in position, the sequence pointer is incremented in block 384, as previously described, and all movement of ramps is terminated.

Figure 2D:
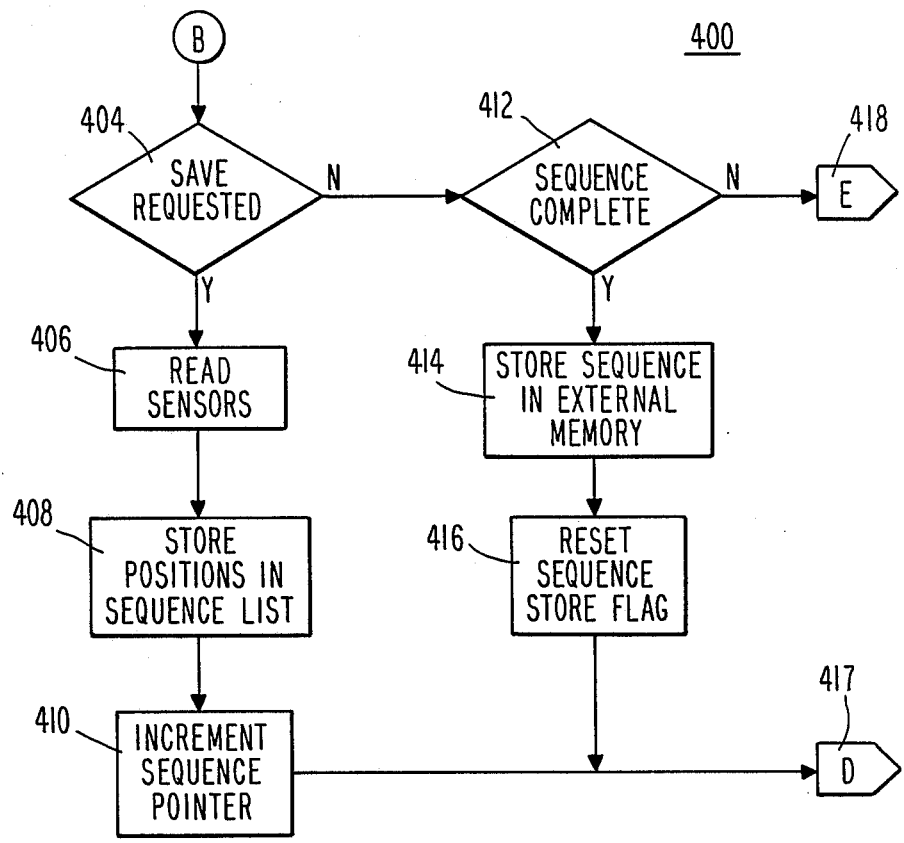

Referring now to FIG. 2D, there is shown flowchart 400. Flowchart 400 is a high level representation of the operations performed during the store sequence mode of the system of the present invention. When the system of the present invention is in the store sequence mode, as determined by in decision 260, execution proceeds by way of offpage connector 262 to onpage connector 402 and a determination is made at decision 404 whether a save has been requested.

During the sequence store mode the operator may adjust the ramps of the trailer as previously described using switches 212, 214, 216, 224, 226, 228 until a set of optimum ramp positions is obtained. By pressing switch 222 of keypad 202, an operator may indicate to CPU 204 that the set of optimum ramp positions is obtained and that the set of ramp positions is to be saved.

If a save is requested, as determined in decision 404, the sensors which indicate the position of the cylinders or ramps within the trailer are read in block 406. The sensors which are read may include the position sensors within the cylinders or the sonar sensors on the ramps. The ramp positions are stored in the sequence list as shown in block 408 and the sequence pointer is incremented as shown in block 410. Execution then proceeds to receive another string from keypad 202 by way of offpage connector 417.

If a save has not been requested, as determined in decision 404, a determination is made at decision 412 whether the sequence is complete. If the sequence is complete the sequence may be stored in external memory 207 as shown in block 414. The sequence store flag is then reset in block 416 and execution exits by way of offpage connector 418. Thus the sequence of sets of ramp positions is available when cars of the same dimensions are again loaded.

If the sequence is not complete, as determined in decision 412, execution exits from routine 400 by way of offpage connector 418 to decision 274 by way of onpage connector 282 where the system operates as if it were not in the sequence store mode or the sequence store mode while the operator adjusts the ramp to obtain the optimum ramp positions.

Figure 2E:
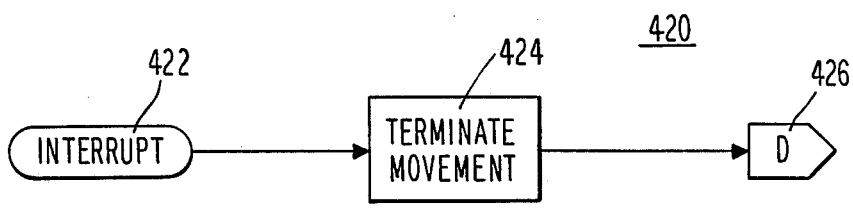

Referring now to FIG. 2E, there is shown interrupt service routine 420. When a ramp is close to the body of a car, raising the risk that the car may be damaged, sensors, such as sensors 128, provide the interrupt signal which causes routine 420 to be executed. Execution begins at interrupt terminal 422 and all movement of all ramps is terminated at block 424. Execution then proceeds, by way of off-page connector 426, to receive a new transmission from keypad 202.

Figure 3:
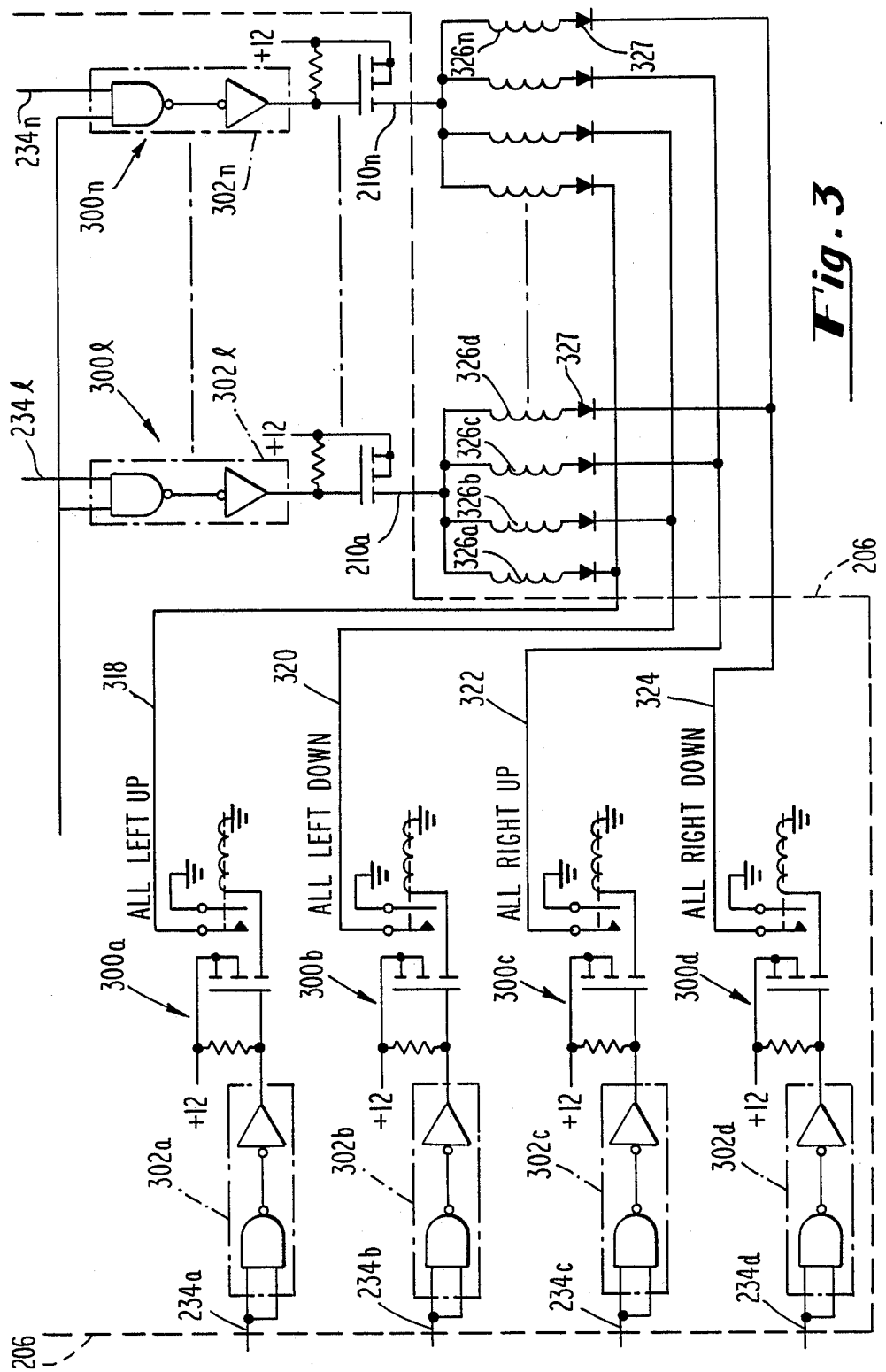
FIG. 3 is a more detailed representation of a portion of the electronics of FIG. 1.

Referring now to FIG. 3, a portion of driver circuits 206 of main box 200 is shown in more detail. Driver circuits 206 include a plurality of drivers 300 a-n. Each driver 300 a-n includes an input line 234 a-n for receiving a signal from CPU 204, logic circuits 302 and conventional electronics as required for receiving a logic level from CPU 204 and driving relays or coils, such as relays 310, 312, 314, 316 or coils 326 a-n in accordance with the received logic level. Driver circuits 206 actuate cylinder valve coils 326a-n in accordance with switches depressed on keypad 202 in order to adjust the positions of the ramps of the trailer.

Referring again to FIG. 4A, enclosed trailer 100 is shown. Enclosed trailer 100 includes sides and roof 102 which can be removed. Additionally, top 102 can be raised using switch 232 as previously described. Rear ramp 104 can be lowered using switch 230 as previously described. When rear ramp 104 is fully raised, roof 102 can hook around the top of ramp 104 to secure ramp 104. Ramp 104 is raised and lowered by cylinders 108 and roof 102 is raised and lowered by cylinders 106. Limit switches 130 are provided to produce feedback when ramp 104 or top 106 are in place.

Drivers 300 a-n are arranged in rows 318, 320, 322, 324 and in columns in which each column is coupled to four electrohydraulic valve coils 326 a-x. Each valve coil 326a-x is provided with a diode 327 to avoid parallel coupling of coils 326a-x when they are grounded. A relay (not shown) is provided between each driver 300e-n and respective coils 326a-m for driving coils 326a-m. The relays (not shown) are similar to relays 310, 312, 314 and 316.

Referring now to FIG. 5, there is shown valve stack assembly 500 including five valve sections 502 arranged in a stack. It will be understood that valve assembly 500 is coupled by lines and hoses in the conventional manner to each of the cylinders of the trailer. In addition, conventional hoses couple valve assembly 500 to the pump and the drain connections of the trailer. The valves of the present invention operate in a known manner as set forth in U.S. Pat. Nos. 4,046,399 and 4,050,596 which are herein incorporated by reference.

Valve assembly 500 is disposed on the left side of the trailer and is therefore coupled to lines 318, 320 in which line 318 is grounded to cause the cylinders on the left side to move up and line 320 is grounded to cause the cylinders on the left side to move down in accordance with the selected row of driver circuits 206 as previously described. For example when line 318 is grounded by relay 310 coil 326a may cause cylinder 1 of Table 1 to move. When line 320 is grounded coil 326b is activated.

The rows of driver circuits 206 are selected by up-/down switches 214, 216 as previously described. A corresponding valve assembly on the right side of the trailer would be coupled to lines 322, 324 which determine whether the selected cylinder controlled by the valve assembly goes up or down, respectively. One of the lines 210, coupled to respective valve section 502, is provided with a twelve-volt level for energizing a coil 326 according to the column of driver circuit 206 selected as previously described.

Referring now to FIG. 6, valve section 502 is shown in more detail. Valve section 502 includes normally closed solenoid pilot valves 514, 516 as well as normally closed pilot operated four-way spool valve 18. Pump line 510 is coupled to the pump of the hydraulic system and drain line 512 is coupled to a reservoir in conventional manner. When pilot valve 14 is actuated, for example, by application of twelve volts to the corresponding line 210a,b and grounding of the corresponding line 318, 320, normally closed pilot valve 514 opens, permitting pressure to be applied to the left side of valve 518. Thus, an hydraulic circuit is provided between lines 510, 512 in which the direction of fluid flow is in a downward direction through line 520b from valve 518, through a cylinder which moves a ramp, and in an upward direction through line 520a. When valve 516 is opened, pressure is applied to the right side of valve 518 creating a path in which fluid flows from pump line 510 to reservoir line 512 downwardly through line 520a from valve 518, through a cylinder, and upwardly through line 520b. Thus the cylinders which move the ramps of the trailer may be moved in either direction under the control of driver circuits 206. When pressure is not applied to either side of valve 518, valve 518 is closed preventing fluid from flowing through lines 520a,b and causing the cylinder controlled by valve section 502 to remain fixed and holding the ramp in a fixed position.

In the position of the present invention the following components have been used for the operation and function as described and shown.

| Reference Numeral | Type |
| --- | --- |
| 112,116 | Tempsonics Linear Displacement Transducer LESA I |
| 128 | Polaroid Ultrasonic Ranging |

-continued

| Reference Numeral | Type |
|---|---|
| | System |
| 204 | Rockwell 6501/Q |
| 207 | 3M D300 |
| 209 | 2732 EPROM |
| 213 | RCA 3290 |

We claim:

1. In a car-carrying trailer having cylinders and ramps and at least one proximity sensor coupled to a ramp wherein the cylinders control the position of the ramps, comprising:
   a single moveable manually activated unit for providing a source of data for controlling substantially all of the cylinders;
   a single transmission link coupled to the unit for receiving the data and transmitting the data from the unit;
   means for receiving and processing the transmitted data and determining ramp position control signals in accordance with the data;
   hydraulic means coupled to the processing means for moving ramps in accordance with the ramp position control signals;
   means coupled to the proximity sensor for determining the distance between the ramp and a vehicle and for providing a proximity sensor signal when a vehicle is within a predetermined distance of the ramp.

2. The trailer of claim 1 in which the processing means is fixed to the trailer.

3. The trailer of claim 1 further comprising means for terminating ramp movement is response to the proximity sensor signal.

4. The trailer of claim 1 in which the proximity sensor comprises a sonar detector.

5. The car-carrying trailer of claim 1 wherein the single transmission link comprises a cable.

6. The car-carrying trailer of claim 1 in which the single transmission link comprises a radio frequency.

7. A method for loading a car into a trailer having a plurality of ramps, each ramp having a ramp position, in a system having memory, comprising the steps of:
   (a) loading a first car into the trailer;
   (b) adjusting the positions of the ramps in accordance with the dimensions of the first car until a first plurality of optimum ramp positions is obtained;
   (c) associating a sequence number with the first plurality of optimum ramp positions;
   (d) producing a set of signals representative of the first plurality of optimum ramp positions and of the associated sequence number; and
   (e) storing the set of signals in the memory.

8. The method of claim 7 wherein steps (a)-(e) are repeated for a first plurality of cars thereby producing and storing a first plurality of sets of signals.

9. The method of claim 8 for loading a second plurality of cars into the trailer, comprising the additional steps of:
   (f) loading a second car of the second plurality of cars into the trailer;
   (g) selecting a set of signals of the first plurality of sets of signals in accordance with the associated sequence number of the selected set; and
   (h) adjusting the position of the ramps in accordance with the selected set of signals.

10. The method of claim 8 wherein steps (f)-(h) are repeated for additional cars in the second plurality of cars.

11. The method of claim 9 wherein all the cars of the second plurality of cars have the same dimensions.

12. The method of claim 9 wherein the cars of the second plurality of cars have differing dimensions.

13. The method of claim 9 for loading a third and fourth plurality of cars having dimensions different from the dimensions of the cars of the second plurality of cars, comprising the steps of:
   (i) loading a third car of the third plurality of cars into the trailer;
   (j) adjusting the positions of the ramps in accordance with the different dimensions of the third car until a second plurality of optimum ramp positions is obtained;
   (k) associating a sequence number with the second plurality of optimum ramp positions;
   (l) producing a set of signals representative of the second plurality of optimum ramp positions and of the associated sequence number;
   (m) storing the set of signals in the memory; and
   (n) loading cars of the fourth plurality of cars and selecting for each car in the fourth plurality of cars set of signals in accordance with both he sequence number and the dimensions of the car to be loaded.

14. The method of claim 7 wherein step (e) is followed by the step of adjusting the position of the first car and repeating steps (a)-(e).

15. The method of claim 7 wherein step (b) includes determining the obtained positions by means of proximity switches.

16. The method of claim 7 wherein step (b) includes determining the obtained depositions by means of ultrasonic sensors.

17. The method of claim 7 wherein step (b) includes determining the obtained positions by means of photosensors.

18. The method of claim 16 wherein the ramp positions are determined by computer modeling.

19. A method for controlling hydraulic cylinders in a car-carrying trailer having ramps wherein the cylinders control the position of the ramps, comprising the steps of:
   manually activating a single moveable unit for providing a source of data;
   transmitting the data from the unit by means of a single transmission link;
   receiving and processing the transmitted data and determining ramp position control signals in accordance with the data;
   moving the hydraulic cylinders in accordance with the ramp position control signals;
   sensing the proximity of the ramp to a car;
   providing a proximity signal when the car is a predetermined distance from the ramp.

20. The method of claim 19 further comprising the step of terminating ramp motion in response to the proximity signal.

21. The method of claim 19 further comprising the step of moving the moveable unit with respect to a fixed means for processing the transmitted data to the trailer.

22. A method for loading cars into a trailer having a plurality of ramps each ramp having a ramp position, comprising the steps of:

(a) placing a test car into the trailer,
(b) adjusting the positions of the ramps in accordance with the dimensions of the test car until optimum ramp positions are obtained;
(c) associating a sequence number with the plurality of optimum ramp positions;
(d) producing a set of signals representative of the plurality of optimum ramp positions and the associated sequence number; and
(e) storing the set of signals;
(f) repeating steps (a)–(e) for cars of different dimensions for producing a plurality of sets of signals, each set including signals representative of predetermined optimum ramp positions and an associated sequence number;
(g) loading cars of a predetermined dimension having an associated sequence number into the trailer;
(h) selecting a set of signals from the plurality of stored signals in accordance with the associated sequence number; and
(i) adjusting the positions of the ramps in accordance with the signals of the selected set.

* * * * *